United States Patent
Cheng et al.

(10) Patent No.: US 7,088,789 B2
(45) Date of Patent: Aug. 8, 2006

(54) APPARATUS FOR PROVIDING A MULTI-MODE INTERFACE BETWEEN A BASEBAND RECEIVER AND RADIO FREQUENCY CIRCUITRY

(75) Inventors: Tai-Yuan Cheng, Hsinchu (TW); Yi-Huei Chen, Hsinchu (TW); Jui-Hsi Cheng, Hsinchu (TW); Tsung-Liang Lin, Hsinchu (TW); Shu-Ping Hsu, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 726 days.

(21) Appl. No.: 10/298,878

(22) Filed: Nov. 18, 2002

(65) Prior Publication Data

US 2004/0013181 A1 Jan. 22, 2004

Related U.S. Application Data

(60) Provisional application No. 60/397,181, filed on Jul. 19, 2002.

(51) Int. Cl.
*H03K 9/00* (2006.01)
*H03F 3/45* (2006.01)

(52) U.S. Cl. .................... 375/316; 327/103
(58) Field of Classification Search ........... 375/216, 375/220, 316; 327/100–103; 341/58
See application file for complete search history.

(56) References Cited

U.S. PATENT DOCUMENTS

| 5,880,618 A * | 3/1999 | Koen .................... 327/351 |
| 6,810,266 B1 * | 10/2004 | Ecklund et al. ......... 455/553.1 |
| 2002/0175688 A1 * | 11/2002 | Yamanaka ............... 324/616 |
| 2003/0067359 A1 * | 4/2003 | Darabi et al. ............ 331/46 |

* cited by examiner

*Primary Examiner*—Jay K. Patel
*Assistant Examiner*—Aslan Ettehadieh
(74) *Attorney, Agent, or Firm*—Thomas, Kayden, Horstemeyer & Risley (57) ABSTRACT

An apparatus for providing a multi-mode interface between a baseband receiver and radio frequency (RF) circuitry. According to a preferred embodiment of the invention, the apparatus includes a first differential-to-single-ended converter, a second differential-to-single-ended converter and an analog-to-digital converter. The first differential-to-single-ended converter receives an incoming differential current pair to be converted into a first single-ended voltage signal. The second differential-to-single-ended converter receives an incoming differential voltage pair to be converted into a second single-ended voltage signal. Further, the analog-to-digital converter selectively receives an incoming single-ended voltage signal, the first single-ended voltage signal, or the second single-ended voltage signal to be converted into a digital signal to be further processed by the baseband processor. Note that the incoming single-ended voltage signal, as well as the incoming differential voltage and current signal pairs together form the multi-mode interface to the RF circuitry.

11 Claims, 11 Drawing Sheets

APPARATUS FOR PROVIDING A MULTI-MODE INTERFACE BETWEEN A BASEBAND RECEIVER AND RADIO FREQUENCY CIRCUITRY

CROSS-REFERENCE TO RELATED APPLICATION

This application is a regular application and claims the benefit of priority from U.S. provisional patent application Ser. No. 60/397,181 filed Jul. 19, 2002, which is also related to a copending application entitled "Apparatus for Providing a Multi-mode Interface between a Baseband Transmitter and Radio Frequency Circuitry", U.S. patent application Ser. No. 10/298,878, filed Nov. 18, 2002.

BACKGROUND OF THE INVENTION

1. Field of the Invention

The invention relates to wireless communications. More particularly, the invention relates to an apparatus for providing a multi-mode interface between a baseband integrated circuit and a radio frequency integrated circuit.

2. Description of the Related Art

Figure 1A:
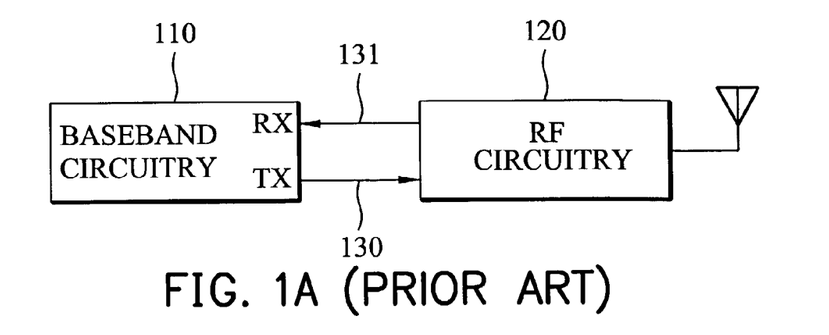
FIGS. 1A~1C are block diagrams illustrating RF ICs with commonly used interfaces to connect corresponding types of baseband ICs in accordance with the prior art.
Figure 1B:
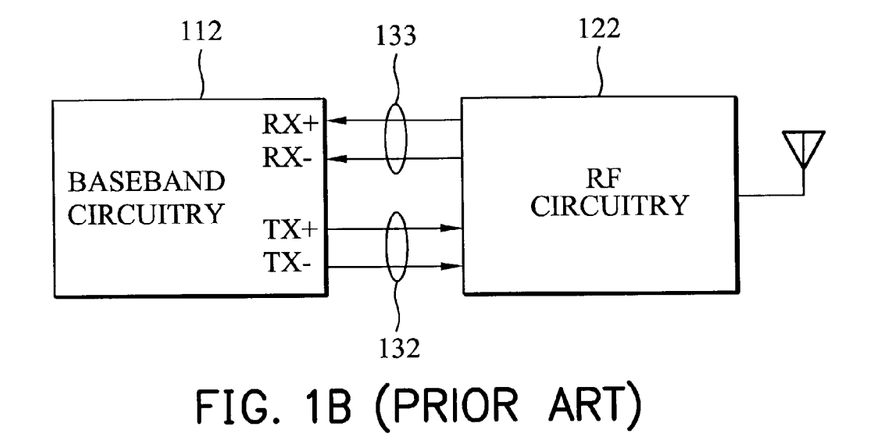
Figure 1C:
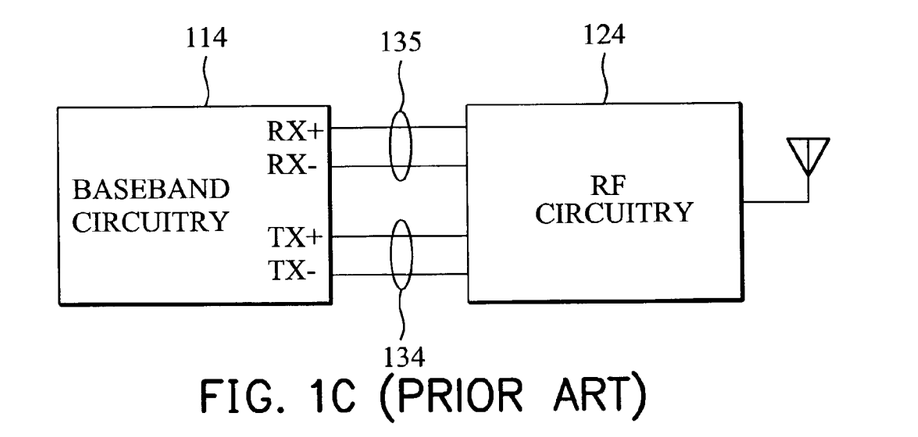

Traditionally, a baseband integrated circuit (IC) may only be connected with a radio frequency (RF) IC through a fixed interface. As illustrated in FIG. 1A, RF circuitry 120 has an interface to transmit and receive single-ended voltage signals to and from baseband circuitry 110. The baseband circuitry 110 provides a corresponding interface to transmit a single-ended voltage signal 130 to the RF circuitry 120, and to receive a single-ended voltage signal 131 from the RF circuitry 120. Referring to FIG. 1B, RF circuitry 122 has an interface to transmit and receive differential voltage signals to and from baseband circuitry 112. To work with the RF circuitry 122, the baseband circuitry 112 provides a corresponding interface to transfer differential voltage signal pairs 132 and 133 with the RF circuitry 122. Turning now to FIG. 1C, baseband circuitry 114 provides an interface to transmit a pair of differential current signals 134 to RF circuitry 124, and to receive a pair of differential current signals 135 from the RF circuitry 124. Hence, the RF circuitry 124 must have a corresponding interface to receive and transmit differential current signals.

However, a conventional baseband IC with a fixed interface, which, as described above, will lack freedom in the choice of an appropriate RF IC. The conventional baseband IC also suffers from difficulty in replacing an existing RF IC with other types. Therefore, what is needed is a baseband IC, especially, a baseband receiver incorporating a multi-mode interface to flexibly connect a wide variety of types of RF circuitry, unencumbered by the limitations associated with the prior art.

SUMMARY OF THE INVENTION

It is an object of the present invention to provide an apparatus for providing a multi-mode interface between a baseband receiver and radio frequency (RF) circuitry.

The present invention is generally directed to a baseband receiver connected with RF circuitry which translates the spectrum of RF signals back to a lower frequency for baseband processing. According to one aspect of the invention, the apparatus includes a differential-to-single-ended converter and an analog-to-digital converter. The differential-to-single-ended converter takes an incoming pair of differential signals and outputs a converted single-ended signal. The analog-to-digital converter selectively takes an incoming single-ended signal or the converted single-ended signal, and outputs a digital signal to be further processed by the baseband receiver. Thus, the incoming single-ended signal and the incoming differential signal pair together form the multi-mode interface to the RF circuitry, in which these signals are selectively allowed to input from the RF circuitry.

According to another aspect of the invention, the apparatus includes a single-ended-to-differential converter and an analog-to-digital converter. The single-ended-to-differential converter takes an incoming single-ended signal and outputs a converted pair of differential signals. The analog-to-digital converter selectively takes an incoming pair of differential signals or the converted pair of differential signals, and outputs a digital signal to be further processed by the baseband receiver. Hence, the incoming single-ended signal and the incoming differential signal pair are provided to form the multi-mode interface to the RF circuitry.

In one embodiment of the present invention, the apparatus includes an analog-to-digital converter, two differential-to-single-ended converters and multiple input terminals. A first input terminal is provided to receive an incoming single-ended voltage signal. Second and third input terminals are provided to receive an incoming pair of differential voltage signals. Further, fourth and fifth input terminals are included to receive an incoming pair of differential current signals. A first differential-to-single-ended converter is coupled to the fourth and the fifth input terminals to receive the incoming pair of differential current signals as a first input pair. The first differential-to-single-ended converter is configured to convert the first input pair into a first single-ended voltage signal for further conversion. A second differential-to-single-ended converter is coupled to the second and the third input terminals. The second differential-to-single-ended converter receives the incoming pair of differential voltage signals as a second input pair. It converts the second input pair into a second single-ended voltage signal for the following conversion. The analog-to-digital converter is coupled to a parallel connection of the first input terminal, the first and the second differential-to-single-ended converters. The analog-to-digital converter selectively receives the incoming single-ended voltage signal, the first single-ended voltage signal, or the second single-ended voltage signal as a third input. It is used to convert the third input into a digital signal to be further processed by the baseband receiver.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 2:
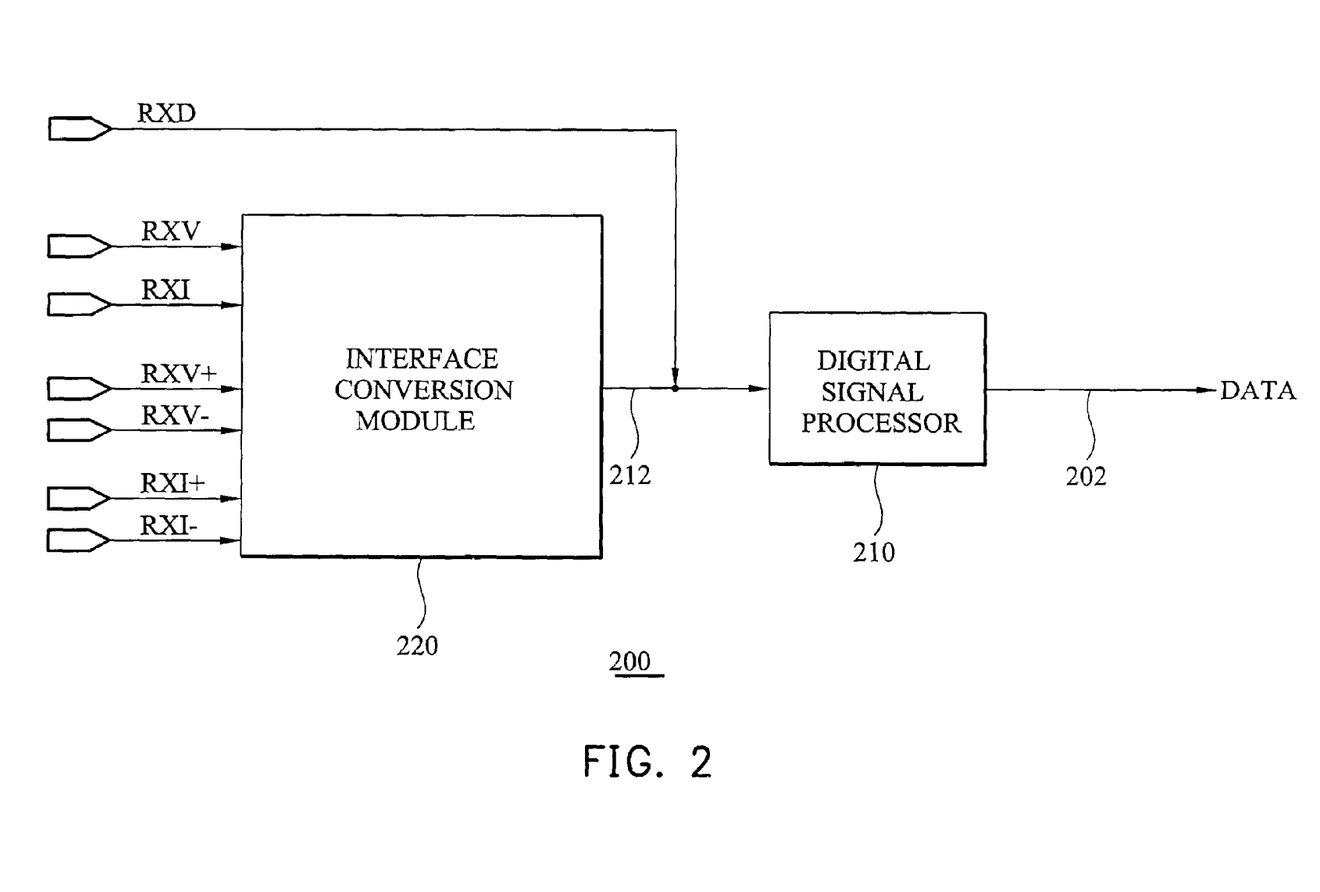
FIG. 2 is a block diagram illustrating a baseband receiver with an interface conversion module of the invention.

FIG. 2 illustrates a block diagram of a baseband receiver 200 according to the invention. To establish a multi-mode interface between a baseband IC and a RF IC, an interface conversion module 220 is provided to convert various signal modes into digital signals. The interface conversion module 220 offers the RXV and RXI inputs to respectively receive a single-ended voltage signal and a single-ended current signal. The interface conversion module 220 offers the RXV+ and RXV− inputs to receive a pair of differential voltage signals, and also offers and the RXI+ and RXI− inputs to receive a pair of differential current signals. On some occasions, RF circuitry may offer a digital signal translated from an analog signal at RF. Therefore, the RXD input of the baseband receiver 200 is available to bypass the interface conversion module 220 in order to directly receive such a digital signal. As depicted, digital signal processor (DSP) 210 receives the digital signals from the interface conversion module 220 via line 212. The DSP 210 serves as a baseband processor and outputs processed data over line 202 for further operations. It should be appreciated that the interface conversion module 220 is well suited for both in-phase (I) and quadrature (Q) components of baseband signals.

Figure 3A:
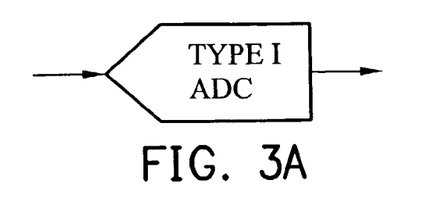
FIGS. 3A~3P are basic building blocks for the interface conversion module in accordance with the invention.
Figure 3B:
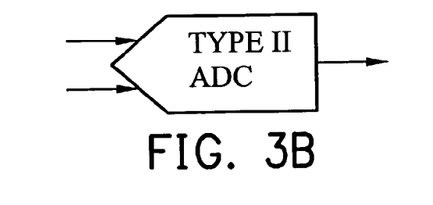
Figure 3C:
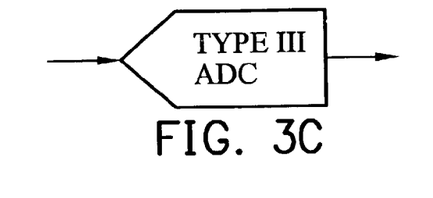
Figure 3D:
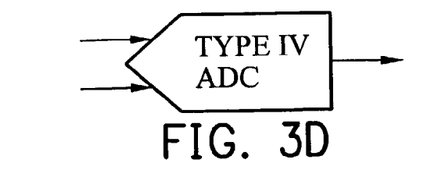
Figure 3E:
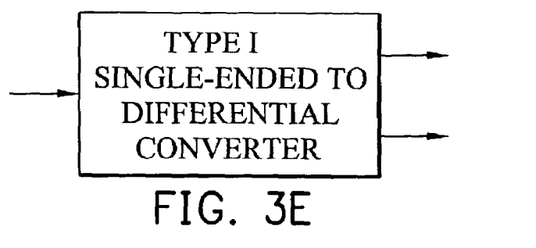
Figure 3F:
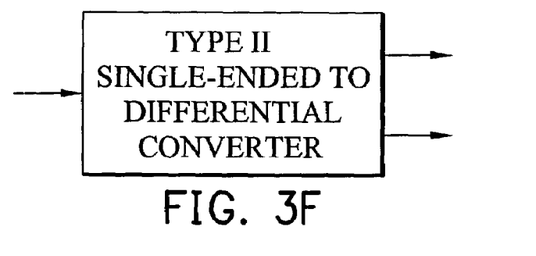
Figure 3G:
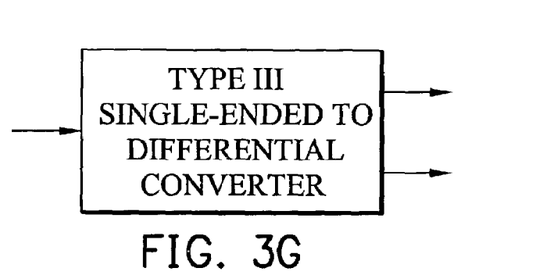
Figure 3H:
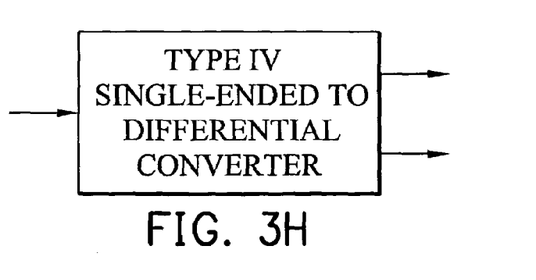
Figure 3I:
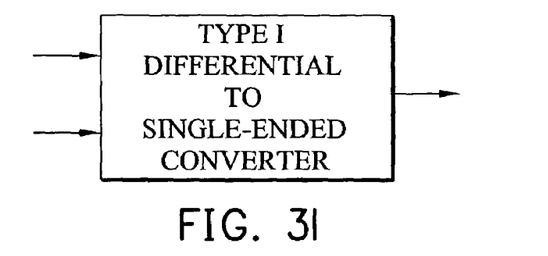
Figure 3J:
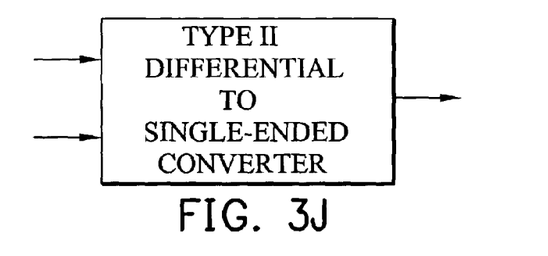
Figure 3K:
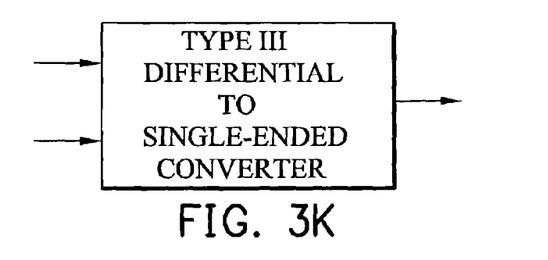
Figure 3L:
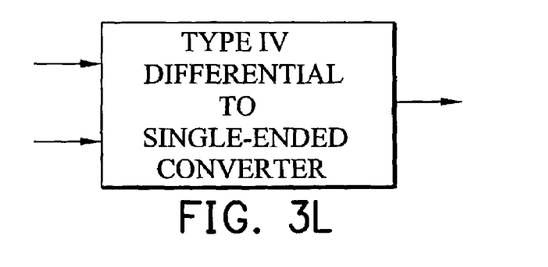
Figure 3M:
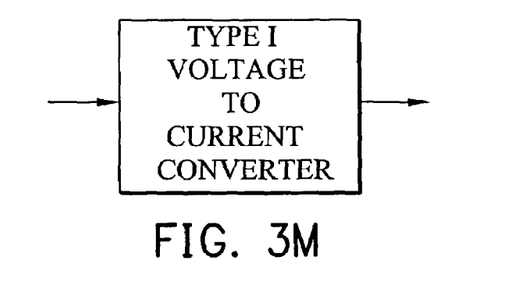
Figure 3N:
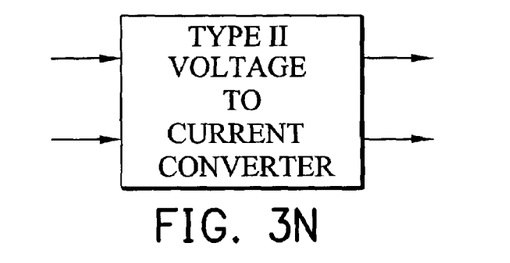
Figure 3O:
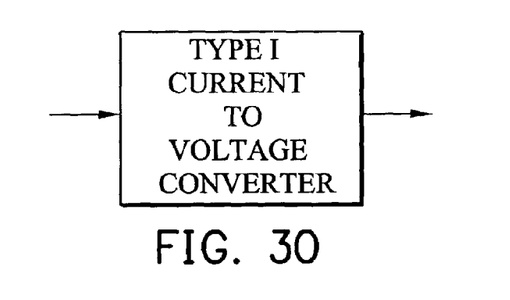
Figure 3P:
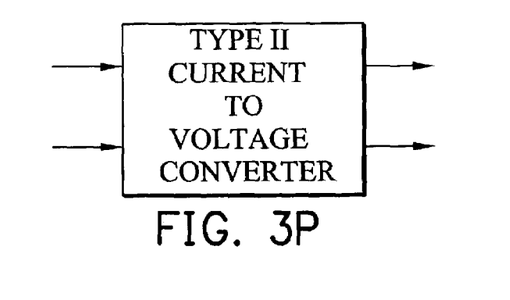

According to the invention, the interface conversion module 220 can be implemented with the following basic building blocks. For brevity, these basic components illustrated in FIGS. 3A~3P are divided into five categories. The first category encompasses four types of analog-to-digital converters (ADCs). TYPE 1 shown in FIG. 3A is a single-ended voltage input ADC. TYPE 2 shown in FIG. 3B is a differential voltage input ADC. TYPE 3 shown in FIG. 3C is a single-ended current input ADC. TYPE 4 shown in FIG. 3D is a differential current input ADC. The second category refers to single-ended-to-differential converters (SDCs) which convert a single-ended signal into a pair of differential signals. TYPE 1 shown in FIG. 3E is a single-ended voltage input and differential voltage output SDC. TYPE 2 shown in FIG. 3F is a single-ended current input and differential voltage output SDC. TYPE 3 shown in FIG. 3G is a single-ended voltage input and differential current output SDC. TYPE 4 shown in FIG. 3H is a single-ended current input and differential current output SDC. The third category pertains to differential-to-single-ended converters (DSCs) which convert a pair of differential signals into a single-ended signal. TYPE 1 shown in FIG. 3I is a differential voltage input and single-ended voltage output DSC. TYPE 2 shown in FIG. 3J is a differential current input and single-ended voltage output DSC. TYPE 3 shown in FIG. 3K is a differential voltage input and single-ended current output DSC. TYPE 4 shown in FIG. 3L is a differential current input and single-ended current output DSC. The fourth category includes two types of voltage-to-current converters (VCCs) which convert a voltage signal into a current signal. TYPE 1 shown in FIG. 3M is a single-ended input and single-ended output VCC. TYPE 2 shown in FIG. 3N is a differential input and differential output VCC. The fifth category contains two types of current-to-voltage converters (CVCs) which convert a current signal into a voltage signal. As illustrated in FIGS. 3O and 3P, TYPE 1 is a single-ended input and single-ended output CVC, and TYPE 2 is a differential input and differential output CVC, respectively.

Figure 4A:
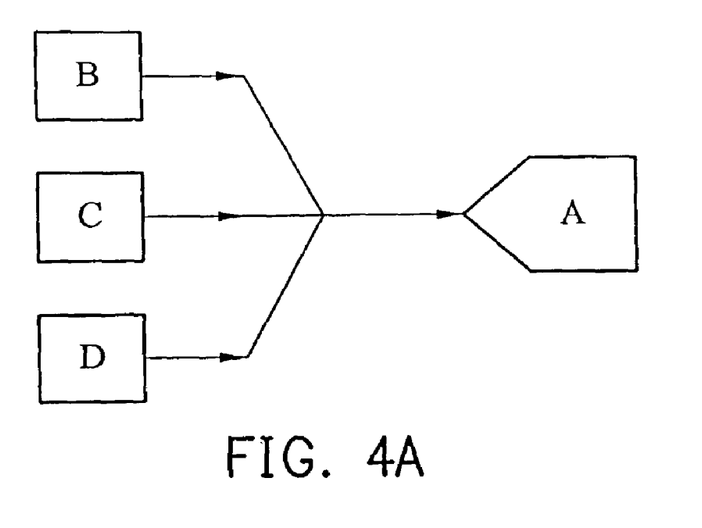
FIGS. 4A~4D are block diagrams illustrating four structures that can be used to implement the interface conversion module in accordance with the invention.
Figure 4B:
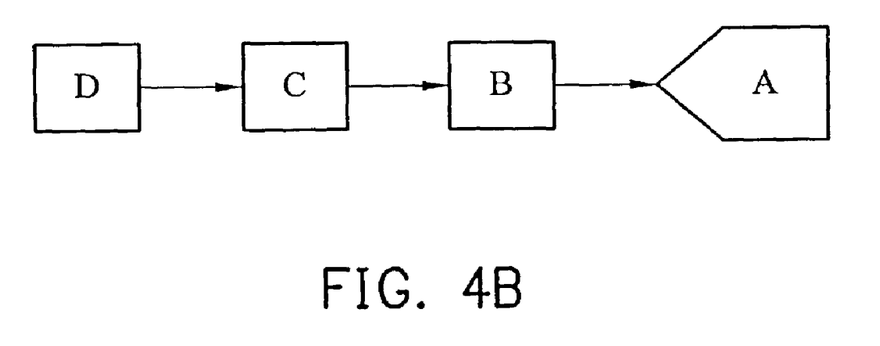
Figure 4C:
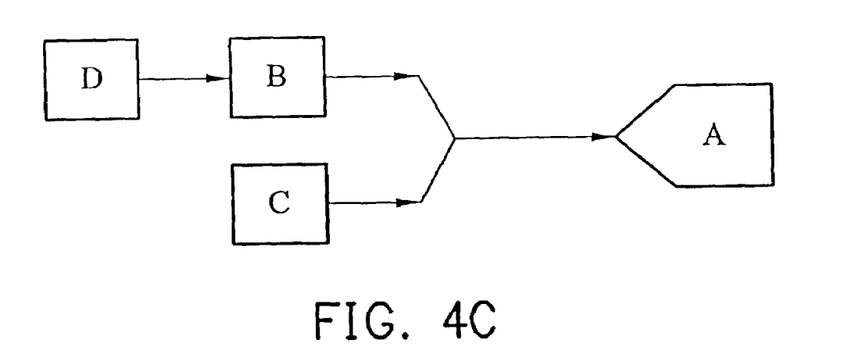
Figure 4D:
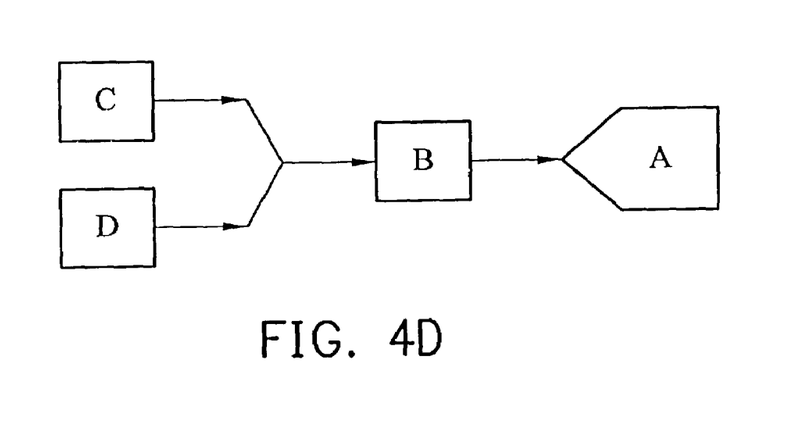

Using these basic components, the interface conversion module 220 can be implemented with four structures. Referring to FIG. 4A, the first structure is a parallel form. In this form the selected basic components are connected in parallel, and the possible configurations for the parallel form are listed here in TABLE 1. Referring to FIG. 4B, the second structure is a cascade form. In this form the selected basic components are connected in cascade, and the possible configurations for the cascade form are listed here in TABLE 2. Referring to FIG. 4C, the third structure is a hybrid form I. In this form, as depicted, the selected basic components are connected in a combination of parallel and cascade forms, and the possible configurations for the hybrid form I are listed here in TABLE 3. Turning now to FIG. 4D, the fourth structure is a hybrid form II. In this form, as depicted, the selected basic components are connected in a second combination of parallel and cascade forms, and the possible configurations for the hybrid form II are listed in TABLE 4 below. With respect to FIGS. 4A~4C as well as TABLES 1~4, note that block A is representative of the ADCs, and Blocks B, C and D are selected from the other categories of the basic building blocks. It should be understood that any suitable permutations and combinations of the basic components are contemplated to implement the interface conversion module 220 by the principles of the invention.

TABLE 1

|   | A | B | C | D |
|---|---|---|---|---|
| 1 | TYPE 1 ADC | TYPE 1 CVC | TYPE 1 DSC | TYPE 2 DSC |
| 2 | TYPE 2 ADC | TYPE 1 SDC | TYPE 2 SDC | TYPE 2 CVC |
| 3 | TYPE 3 ADC | TYPE 1 VCC | TYPE 3 DSC | TYPE 4 DSC |
| 4 | TYPE 4 ADC | TYPE 3 SDC | TYPE 2 VCC | TYPE 4 SDC |

TABLE 2

|    | A | B | C | D |
|----|---|---|---|---|
| 1  | TYPE 1 ADC | TYPE 1 DSC | TYPE 2 SDC | TYPE 4 DSC |
| 2  | TYPE 1 ADC | TYPE 1 CVC | TYPE 3 DSC | TYPE 2 CVC |
| 3  | TYPE 1 ADC | TYPE 2 DSC | TYPE 2 VCC | TYPE 2 SDC |
| 4  | TYPE 1 ADC | TYPE 1 DSC | TYPE 2 CVC | TYPE 4 SDC |
| 5  | TYPE 1 ADC | TYPE 1 CVC | TYPE 4 DSC | TYPE 2 VCC |
| 6  | TYPE 1 ADC | TYPE 2 DSC | TYPE 4 SDC | TYPE 3 DSC |
| 7  | TYPE 2 ADC | TYPE 1 SDC | TYPE 1 CVC | TYPE 4 DSC |
| 8  | TYPE 2 ADC | TYPE 2 SDC | TYPE 1 VCC | TYPE 2 DSC |
| 9  | TYPE 2 ADC | TYPE 2 CVC | TYPE 3 SDC | TYPE 1 CVC |
| 10 | TYPE 2 ADC | TYPE 1 SDC | TYPE 2 DSC | TYPE 4 SDC |
| 11 | TYPE 2 ADC | TYPE 2 SDC | TYPE 4 DSC | TYPE 3 SDC |
| 12 | TYPE 2 ADC | TYPE 2 CVC | TYPE 4 SDC | TYPE 1 VCC |
| 13 | TYPE 3 ADC | TYPE 1 VCC | TYPE 1 DSC | TYPE 2 CVC |
| 14 | TYPE 3 ADC | TYPE 3 DSC | TYPE 1 SDC | TYPE 2 DSC |
| 15 | TYPE 3 ADC | TYPE 4 DSC | TYPE 3 SDC | TYPE 1 DSC |
| 16 | TYPE 3 ADC | TYPE 1 VCC | TYPE 2 DSC | TYPE 2 VCC |
| 17 | TYPE 3 ADC | TYPE 3 DSC | TYPE 2 CVC | TYPE 3 SDC |
| 18 | TYPE 3 ADC | TYPE 4 DSC | TYPE 2 VCC | TYPE 1 SDC |
| 19 | TYPE 4 ADC | TYPE 3 SDC | TYPE 1 DSC | TYPE 2 SDC |
| 20 | TYPE 4 ADC | TYPE 2 VCC | TYPE 1 SDC | TYPE 1 CVC |
| 21 | TYPE 4 ADC | TYPE 4 SDC | TYPE 1 VCC | TYPE 1 DSC |
| 22 | TYPE 4 ADC | TYPE 3 DSC | TYPE 1 CVC | TYPE 3 DSC |
| 23 | TYPE 4 ADC | TYPE 2 VCC | TYPE 2 SDC | TYPE 1 VCC |
| 24 | TYPE 4 ADC | TYPE 4 SDC | TYPE 3 DSC | TYPE 1 SDC |

TABLE 3

|   | A | B | C | D |
|---|---|---|---|---|
| 1 | TYPE 1 ADC | TYPE 1 DSC | TYPE 1 CVC | TYPE 2 CVC |
| 2 | TYPE 1 ADC | TYPE 1 DSC | TYPE 2 DSC | TYPE 2 SDC |
| 3 | TYPE 1 ADC | TYPE 1 CVC | TYPE 2 DSC | TYPE 3 DSC |
| 4 | TYPE 1 ADC | TYPE 1 CVC | TYPE 1 DSC | TYPE 4 DSC |
| 5 | TYPE 1 ADC | TYPE 2 DSC | TYPE 1 DSC | TYPE 4 SDC |
| 6 | TYPE 1 ADC | TYPE 2 DSC | TYPE 1 CVC | TYPE 2 VCC |
| 7 | TYPE 2 ADC | TYPE 1 SDC | TYPE 2 SDC | TYPE 2 DSC |
| 8 | TYPE 2 ADC | TYPE 1 SDC | TYPE 2 CVC | TYPE 1 CVC |
| 9 | TYPE 2 ADC | TYPE 2 SDC | TYPE 2 CVC | TYPE 1 VCC |
| 10 | TYPE 2 ADC | TYPE 2 SDC | TYPE 1 SDC | TYPE 4 DSC |
| 11 | TYPE 2 ADC | TYPE 2 CVC | TYPE 1 SDC | TYPE 4 SDC |
| 12 | TYPE 2 ADC | TYPE 2 CVC | TYPE 2 SDC | TYPE 3 SDC |
| 13 | TYPE 3 ADC | TYPE 1 VCC | TYPE 3 DSC | TYPE 2 DSC |
| 14 | TYPE 3 ADC | TYPE 1 VCC | TYPE 4 DSC | TYPE 1 DSC |
| 15 | TYPE 3 ADC | TYPE 3 DSC | TYPE 4 DSC | TYPE 1 SDC |
| 16 | TYPE 3 ADC | TYPE 3 DSC | TYPE 1 VCC | TYPE 2 CVC |
| 17 | TYPE 3 ADC | TYPE 4 DSC | TYPE 1 VCC | TYPE 2 VCC |
| 18 | TYPE 3 ADC | TYPE 4 DSC | TYPE 3 DSC | TYPE 3 DSC |
| 19 | TYPE 4 ADC | TYPE 3 SDC | TYPE 2 VCC | TYPE 1 CVC |
| 20 | TYPE 4 ADC | TYPE 3 SDC | TYPE 4 SDC | TYPE 1 DSC |
| 21 | TYPE 4 ADC | TYPE 2 VCC | TYPE 4 SDC | TYPE 1 SDC |
| 22 | TYPE 4 ADC | TYPE 2 VCC | TYPE 3 SDC | TYPE 2 SDC |
| 23 | TYPE 4 ADC | TYPE 4 SDC | TYPE 3 SDC | TYPE 3 DSC |
| 24 | TYPE 4 ADC | TYPE 4 SDC | TYPE 2 VCC | TYPE 1 VCC |

TABLE 4

|   | A | B | C | D |
|---|---|---|---|---|
| 1 | TYPE 1 ADC | TYPE 1 DSC | TYPE 2 SDC | TYPE 2 CVC |
| 2 | TYPE 1 ADC | TYPE 1 CVC | TYPE 3 DSC | TYPE 4 DSC |
| 3 | TYPE 1 ADC | TYPE 2 DSC | TYPE 2 VCC | TYPE 4 SDC |
| 4 | TYPE 2 ADC | TYPE 1 SDC | TYPE 2 DSC | TYPE 1 CVC |
| 5 | TYPE 2 ADC | TYPE 2 SDC | TYPE 1 VCC | TYPE 4 DSC |
| 6 | TYPE 2 ADC | TYPE 2 CVC | TYPE 3 SDC | TYPE 4 SDC |
| 7 | TYPE 3 ADC | TYPE 1 VCC | TYPE 1 DSC | TYPE 2 DSC |
| 8 | TYPE 3 ADC | TYPE 3 DSC | TYPE 1 SDC | TYPE 2 CVC |
| 9 | TYPE 3 ADC | TYPE 4 DSC | TYPE 3 SDC | TYPE 2 VCC |
| 10 | TYPE 4 ADC | TYPE 3 SDC | TYPE 1 DSC | TYPE 1 CVC |
| 11 | TYPE 4 ADC | TYPE 2 VCC | TYPE 1 SDC | TYPE 2 SDC |
| 12 | TYPE 4 ADC | TYPE 4 SDC | TYPE 1 VCC | TYPE 3 DSC |

Figure 5:
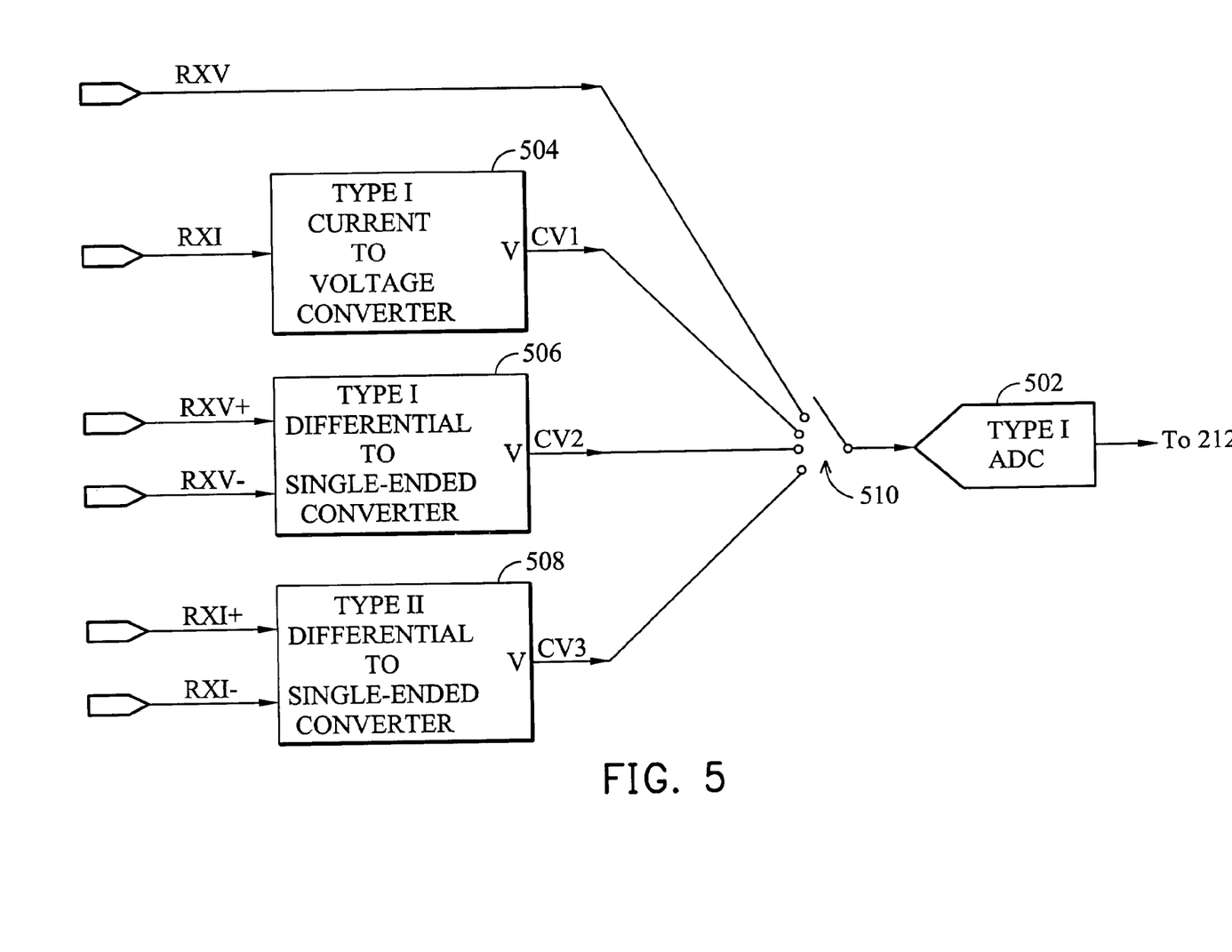
FIG. 5 is a block diagram illustrating a first embodiment of the invention.

As examples of the implementation of the interface conversion module 220 in terms of the basic components, a first embodiment of the invention is illustrated in FIG. 5. In this embodiment, the interface conversion module 220 is implemented with the parallel form of the invention. From configuration 1 listed in TABLE 1, block A is the TYPE 1 ADC, block B is the TYPE 1 CVC, block C is the TYPE 1 DSC, and block D is the TYPE 2 DSC. The TYPE 1 CVC 504 is coupled to the RXI input. It receives an incoming single-ended current signal to be converted into a single-ended voltage signal CV1. The TYPE 1 DSC 506 is coupled to the RXV+ and RXV− inputs to receive an incoming pair of differential voltage signals. The TYPE 1 DSC 506 converts the incoming differential voltage signal pair into a single-ended voltage signal CV2. The TYPE 2 DSC 508 is coupled to the RXI+ and RXI− inputs to receive an incoming pair of differential current signals. The TYPE 2 DSC 508 performs a conversion of the incoming differential current signal pair to a single-ended voltage signal CV3. The TYPE 1 ADC 502 is coupled to the RXV input. As depicted, it is also coupled to the parallel connection of the TYPE 1 CVC 504, the TYPE 1 DSC 506 and the TYPE 2 DSC 508. Note that a selection unit 510 is optionally used to choose the input for the TYPE 1 ADC 502. In other words, the TYPE 1 ADC 502 selectively receives an incoming single-ended voltage signal, the CV1 signal, the CV2 signal, or the CV3 signal as its input. The TYPE 1 ADC 502 then converts its input into a digital signal to be further processed by the DSP 210. Thus, the interface conversion module 220 supports a multi-mode interface between the baseband receiver 200 and a RF IC.

Figure 6:
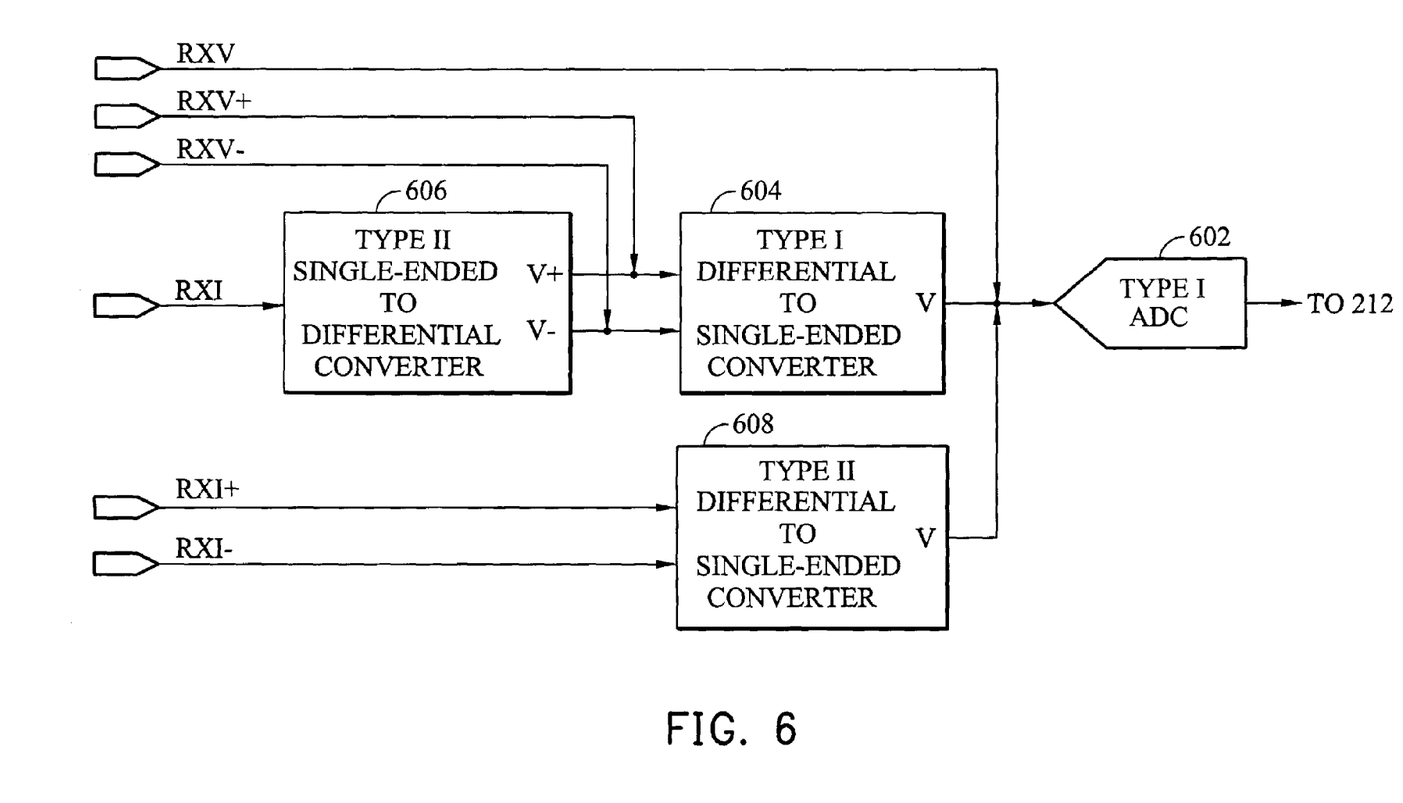
FIG. 6 is a block diagram illustrating a second embodiment of the invention.

In a second embodiment, the interface conversion module 220 is implemented with the hybrid form I as shown in FIG. 6. From configuration 2 set forth in TABLE 3, block A is the TYPE 1 ADC, block B is the TYPE 1 DSC, block C is the TYPE 2 DSC, and block D is the TYPE 2 SDC. The TYPE 2 DSC 608 is coupled to the RXI+ and RXI− inputs to receive an incoming pair of differential current signals. The TYPE 2 DSC 608 performs a conversion of the incoming differential current signal pair to a single-ended voltage signal. The TYPE 2 SDC 606 is coupled to the RXI input. The TYPE 2 SDC 606 receives an incoming single-ended current signal to be converted into a pair of differential voltage signals. The converted differential voltage signals are provided on the V+ and V− outputs of the TYPE 2 SDC 606, respectively. The TYPE 1 DSC 604 is coupled to the RXV+ and RXV− inputs, as well as the TYPE 2 SDC 606. The TYPE 1 DSC 604 selectively receives an incoming pair of differential voltage signals or the converted pair of differential voltage signals to be converted into a single-ended voltage signal. This converted single-ended voltage signal is provided on the V output of the TYPE 1 DSC 604. Next, the TYPE 1 ADC 602 is coupled to the RXV input, the TYPE 1 DSC 604 and the TYPE 2 DSC 608. The TYPE 1 ADC 602 selectively receives an incoming single-ended voltage signal from the RXV input, the converted single-ended voltage signal from the TYPE 1 DSC 604, or the converted single-ended voltage signal from the TYPE 2 DSC 608. Hence, the TYPE 1 ADC 602 converts its single-ended voltage input into a digital output signal to be further processed by the DSP 210.

Figure 7:
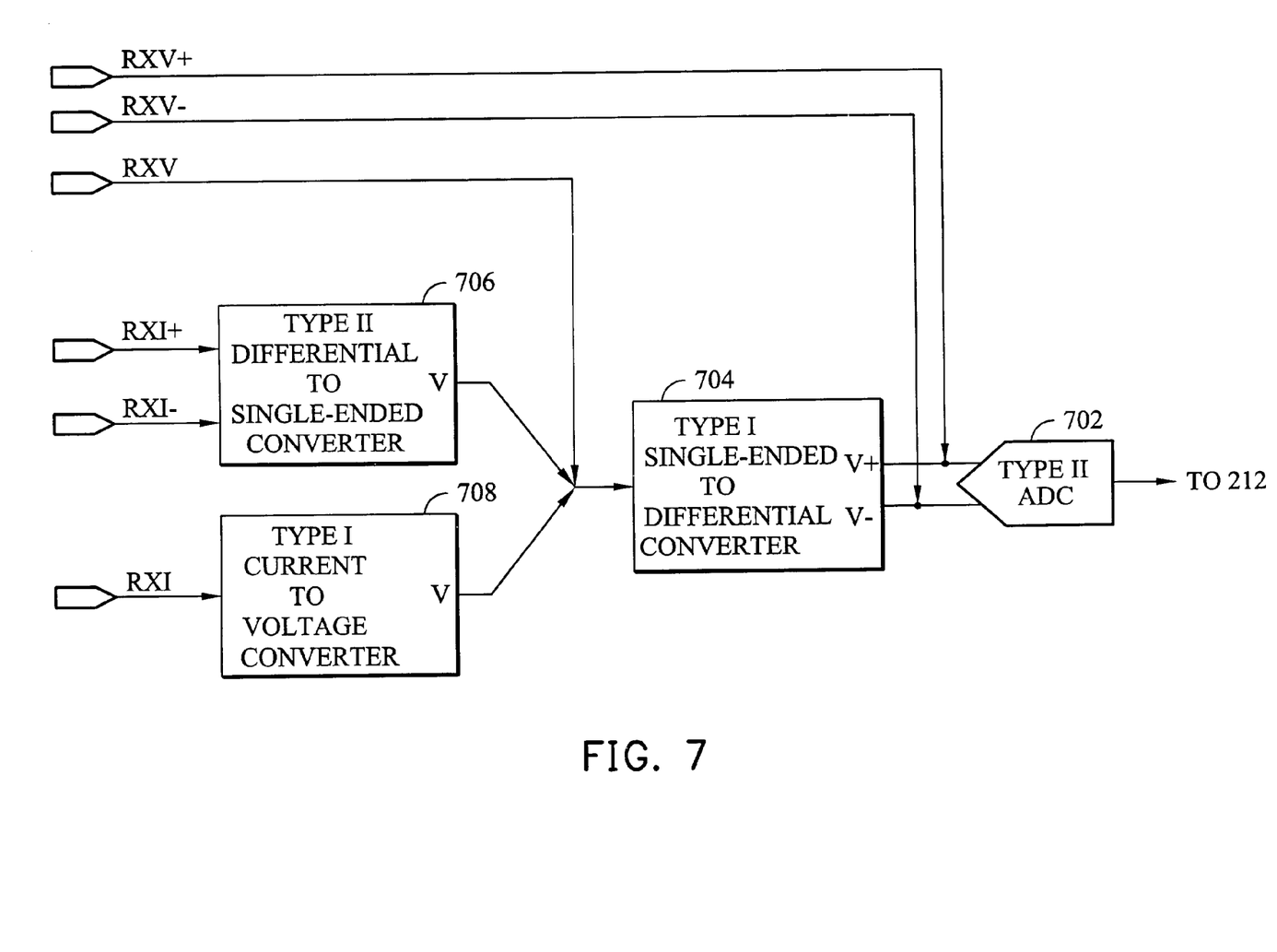
FIG. 7 is a block diagram illustrating a third embodiment of the invention.

In a third embodiment, the interface conversion module 220 is implemented with the hybrid form II as shown in FIG. 7. From configuration 4 listed in TABLE 4, block A is the TYPE 2 ADC, block B is the TYPE 1 SDC, block C is the TYPE 2 DSC, and block D is the TYPE 1 CVC. The TYPE 2 DSC 706 is coupled to the RXI+ and RXI− inputs to receive an incoming pair of differential current signals. The TYPE 2 DSC 706 performs a conversion of the incoming differential current signal pair to a single-ended voltage signal. This converted single-ended voltage signal is provided on the V output of the TYPE 2 DSC 706. The TYPE 1 CVC 708 is coupled to the RXI input to receive an incoming single-ended current signal. It performs a conversion of the single-ended current signal to a single-ended voltage signal that is provided on the V output of the TYPE 1 CVC 708. Next, the TYPE 1 SDC 704 is coupled to the RXV input, as well as the parallel connection of the TYPE 2 DSC 706 and the TYPE 1 CVC 708. The TYPE 1 SDC 704 selectively receives an incoming single-ended voltage signal from the RXV input, the converted single-ended voltage signal from the TYPE 2 DSC 706, or the converted single-ended voltage signal from the TYPE 1 CVC 708. The TYPE 1 SDC 704 converts its single-ended voltage input into a pair of differential voltage signals. The converted differential voltage signals are provided on the V+ and V− outputs of the TYPE 1 SDC 704, respectively. The TYPE 2 ADC 702 is coupled to the RXV+ and RXV− inputs, as well as connected to the TYPE 1 SDC 704. Finally, the TYPE 2 ADC 702 selectively receives an incoming or the converted pair of differential current signals to be converted into a digital signal to be further processed by the DSP 210.

With the highly flexible multi-mode interface, the baseband receiver 200 offers all necessary input modes to accommodate the most common RF ICs in the industry. It should be appreciated that the baseband receiver 200 needs not enable all of the input modes at the same time. The input modes of the baseband receiver 200 may be digital, single-ended voltage, single-ended current, differential voltage or differential current, or a combination. When one of the input modes is chosen to interface with the desired RF IC, the rest of the input modes have to be disabled. The inoperative components implemented in the interface conversion module 220 may enter a power-down state to prevent unnecessary power consumption. Furthermore, depending on practical applications, baseband transmitters working in conjunction with the baseband receiver of the invention are not limited to those having symmetrical design and corresponding interface.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An apparatus for providing a multi-mode interface between a baseband receiver and radio frequency (RF) circuitry, the RF circuitry translating incoming RF signals to baseband for the baseband receiver, the apparatus comprising:
   a first input terminal, for receiving an incoming single-ended voltage signal;
   a second and third input terminal, for receiving an incoming pair of differential voltage signals;
   a fourth and fifth input terminal, for receiving an incoming pair of differential current signals;
   a first differential-to-single-ended converter, coupled to the fourth and the fifth input terminals, receiving the incoming differential current signal pair as a first input pair, for converting the first input pair into a first single-ended voltage signal;
   a second differential-to-single-ended converter, coupled to the second and the third input terminals, receiving the incoming differential voltage signal pair as a second input pair, for converting the second input pair into a second single-ended voltage signal; and
   an analog-to-digital converter, coupled to the first input terminal as well as the first and the second differential-to-single-ended converters, selectively receiving the incoming single-ended voltage signal, the first single-ended voltage signal, or the second single-ended voltage signal as a third input, for converting the third input into a digital signal to be further processed by the baseband receiver.

2. The apparatus as recited in claim 1 further comprising:
   a sixth input terminal, for receiving an incoming single-ended current signal; and
   a current-to-voltage converter, coupled to the sixth input terminal, for taking the incoming single-ended current signal and outputting a third single-ended voltage signal to the analog-to-digital converter where the third single-ended voltage signal is selectively received as the third input.

3. The apparatus as recited in claim 1 further comprising:
   a sixth input terminal, for receiving an incoming single-ended current signal; and
   a single-ended-to-differential converter, coupled to the sixth input terminal, for taking the incoming single-ended current signal and outputting a converted pair of differential voltage signals to the second differential-to-single-ended converter where the converted differential voltage signal pair are selectively received as the second input pair.

4. The apparatus as recited in claim 1 further comprising:
   a sixth input terminal, for receiving an incoming single-ended current signal; and
   a single-ended-to-differential converter, coupled to the sixth input terminal, for taking the incoming single-ended current signal and outputting a converted pair of differential current signals to the first differential-to-single-ended converter where the converted differential current signal pair are selectively received as the first input pair.

5. The apparatus as recited in claim 1 further comprising a seventh input terminal for directly receiving an incoming digital signal translated by the RF circuitry as the digital signal to be further processed.

6. An apparatus for providing a multi-mode interface between a baseband receiver and radio frequency (RF) circuitry, the RF circuitry translating incoming RF signals to baseband for the baseband receiver, the apparatus comprising:
   a first differential-to-single-ended converter for taking an incoming pair of differential signals and outputting a converted single-ended signal; and
   an analog-to-digital converter for selectively taking an incoming single-ended signal or the converted single-ended signal, and outputting a digital signal to be further processed by the baseband receiver;
   a second differential-to-single-ended converter for receiving an incoming pair of differential current signals, performing a conversion of the incoming current signal pair to a second single-ended voltage signal, and outputting the second single-ended voltage signal to the analog-to-digital converter where the second single-ended voltage signal is selectively received to be converted into the digital signal;
   whereby the incoming single-ended signal and the incoming differential signal pair together form the multi-mode interface to the RF circuitry.

7. The apparatus as recited in claim 6 wherein the incoming differential signal pair is a differential voltage signal and the differential-to-single-ended converter changes the incoming differential voltage signal pair into a first single-ended voltage signal as the converted single-ended signal.

8. The apparatus as recited in claim 7 wherein the incoming single-ended signal is a single-ended voltage signal and the analog-to-digital converter selectively receives the incoming single-ended voltage signal or the first single-ended voltage signal to be converted into the digital signal.

9. The apparatus as recited in claim 8 further comprising a current-to-voltage converter for receiving an incoming single-ended current signal, performing a conversion of the incoming single-ended current signal to a second single-ended voltage signal, and outputting the second single-ended voltage signal to the analog-to-digital converter where the second single-ended voltage signal is selectively received to be converted into the digital signal.

10. The apparatus as recited in claim 8 further comprising a single-ended-to-differential converter for receiving an incoming single-ended current signal, performing a conversion of the incoming single-ended current signal to a converted pair of differential voltage signals, and outputting the converted differential voltage signal pair to the first differential-to-single-ended converter where the converted differential voltage signal pair are selectively received to be converted into the first single-ended voltage.

11. The apparatus as recited in claim 6 further comprising an input terminal to directly receive an incoming digital signal translated by the RF circuitry such that the multi-mode interface includes the incoming single-ended signal, the incoming differential signal pair and the incoming digital signal.

* * * * *